(12) United States Patent
Frejborg

(10) Patent No.: US 7,168,570 B2
(45) Date of Patent: Jan. 30, 2007

(54) SCREEN CYLINDER WITH PERFORMANCE BOOSTING CONFIGURATION

(75) Inventor: Frey Frejborg, Queensbury, NY (US)

(73) Assignee: Advanced Fiber Technologies, Lennoxville (CA)

( * ) Notice: Subject to any disclaimer, the term of this patent is extended or adjusted under 35 U.S.C. 154(b) by 0 days.

(21) Appl. No.: 10/399,973

(22) PCT Filed: Oct. 24, 2001

(86) PCT No.: PCT/US01/32631

§ 371 (c)(1),
(2), (4) Date: Dec. 8, 2003

(87) PCT Pub. No.: WO02/34356

PCT Pub. Date: May 2, 2002

(65) Prior Publication Data

US 2004/0099583 A1    May 27, 2004

(51) Int. Cl.
*B07B 1/20*    (2006.01)
(52) U.S. Cl. .................. 209/283; 209/305; 209/306
(58) Field of Classification Search .................. 209/17, 209/273, 283, 305, 306; 210/413, 414, 415, 210/512.1
See application file for complete search history.

(56) References Cited

U.S. PATENT DOCUMENTS

| 3,880,711 | A |   | 4/1975  | Hayes, Jr. |
| 3,945,920 | A |   | 3/1976  | Paszye et al. |
| 4,268,382 | A |   | 5/1981  | Hanke et al. |
| 4,529,520 | A | * | 7/1985  | Lampenius .................. 210/498 |
| 5,255,790 | A |   | 10/1993 | Einoder et al. |
| 5,259,512 | A | * | 11/1993 | Czerwoniak ................. 209/273 |
| 5,513,757 | A | * | 5/1996  | Papetti ........................ 209/406 |
| 5,524,770 | A |   | 6/1996  | LeBlanc et al. |
| 5,607,589 | A |   | 3/1997  | Frejborg |
| 5,607,859 | A | * | 3/1997  | Biemann et al. ............. 436/173 |
| 5,727,316 | A | * | 3/1998  | Riendeau .................. 29/896.62 |
| 6,119,867 | A |   | 9/2000  | Ljokkoi et al. |
| 6,595,373 | B1 | * | 7/2003 | Seifert ......................... 210/488 |

FOREIGN PATENT DOCUMENTS

| DE | 91 98 129    | 10/1991 |
| WO | WO 90/10110  | 9/1990  |
| WO | WO 99/50019  | 10/1999 |
| WO | WO 00/20091  | 4/2000  |

* cited by examiner

*Primary Examiner*—Joseph Rodriguez
(74) *Attorney, Agent, or Firm*—Heslin Rothenberg Farley & Mesiti P.C.; John Pietrangelo

(57) ABSTRACT

A screen cylinder (125) used for screening cellulosic fibrous material pulp in the pulp and paper industry incorporates first (66) and second (67) downstream surfaces (16) having contoured slopes that form a funnel entrance of the grooves (13) at the screen cylinder slots (17). The contoured construction of the screen cylinder (125) effects greatly enhanced utility compared to conventional milled and discrete element screen cylinders, including substantially avoiding the Coanda effect.

22 Claims, 8 Drawing Sheets

SCREEN CYLINDER WITH PERFORMANCE BOOSTING CONFIGURATION

This application is the U.S. national phase of international application PCT/US01/32631 filed 24 Oct. 2001, which designated the U.S.

BACKGROUND AND SUMMARY OF THE INVENTION

There are significant differences between the two main types of screen cylinders with slotted apertures that are used for screening cellulosic fibrous material pulp in the pulp and paper industry, namely milled screen cylinders, and screen cylinders fabricated from discrete elements, such as bars or wires. The screen cylinders formed from discrete elements, including wedge wire screen cylinders, are perceived to have higher capacity than milled screen cylinders because there is more potential open area. However conventional wedge wire screens also have significantly lower debris removal efficiency than conventional milled cylinders. For example in one test conducted between a wedge wire cylinder and a milled cylinder which had similar configurations and were manufactured by the same company, the milled cylinder had a debris removal efficiency of over 77% while the wedge wire cylinder had a debris removal efficiency of about 40%, using the same pulp furnish. In said co-pending application various techniques and procedures are illustrated and described for enhancing the functionality of wedge wire cylinders so that they more closely approximate the debris removal efficiency of the wedge wire screen cylinders compared to milled screen cylinders, including by avoiding the Coanda effect, and by providing a plug phenomena during the negative pulse cycle. However it has also been recognized as desirable for many years to increase the capacity of milled cylinders so that they more closely approximate that of cylinders made of discrete elements (such as wedge wire cylinders).

According to the present invention screen cylinders, and methods of utilization and manufacture thereof, are provided which have greatly enhanced utility compared to conventional milled and discrete element screen cylinders. For example according to the present invention it has been found that even compared to commercial screen cylinders with popular contours (such as those sold by CAE ScreenPlates and known as the "D-PROFILE"™) may greatly increase capacity while maintaining at least as good debris removal efficiency [capacity enhancement is not worthwhile if it results in significant debris removal efficiency loss] by making seemingly very minor changes in the configuration of the grooves at the slots. As a matter of fact milled cylinders can be so improved by practicing the present invention that a milled cylinder with smaller slots can have a higher capacity than a conventional wedge wire cylinder with larger slots, something considered impossible in the prior art. However the invention is not limited to improvements in milled cylinders, but also can significantly enhance the performance of wedge wire, or other discrete element, cylinders, i.e. the debris removal efficiency of discrete element screen cylinders can be improved dramatically.

The effect on capacity with the present invention increases as slot sizes get smaller and decreases as slots get larger. The invention is not expected to have any significant effect at slot sizes above 1 mm, but the invention has a dramatic effect for slot sizes below 1 mm, and especially between about 0.05–0.5 mm (and all narrower ranges within that broad range). The general goal in screening is increasingly to use the smallest possible slots for the highest possible debris removal efficiency. The constraining factor is loss of capacity and other operational problems if slots are too small. The present invention will allow further decreases in slot sizes than was possible before.

Exactly what theory explains the highly advantageous results that can be achieved according to the present invention is not presently well understood. With respect to discrete element cylinders, it is believed that the elimination of the Coanda effect, compared with a funneling type action adjacent the slot, are responsible, but exactly how the funneling action adjacent the slot creates the favorable flow conditions that achieve the desired results according to the present invention is not presently well understood.

Something that may explain the advantageous results according to the present invention is the ability of the invention to deal with fiber flocs. While those in the art have a tendency to consider that the fiber stock being screened has homogeneously distributed fibers, such as illustrated two dimensionally in FIG. 8 (the real fibers and flocs are three dimensional), in fact typically flocs of fibers are formed in the stock slurry, as illustrated in FIG. 9. To put the floc formation into a practical perspective, if a certain type of fiber will form flocs at one percent consistency within 100 micro-seconds, at three percent consistency only 10 micro-seconds may be needed to form a floc. It is believed that the particular contour of the cylinders according to the present invention de-flocculates the clusters into individual fibers separated by a film of water. If the fibers are not de-flocculated (fluidized), especially smaller slots and sharp edges or slot entrances with radiuses that are too small, will make it difficult for "intact" flocs to enter the slot. Then the flocs will be rejected as debris while the water portion between the flocs passes into the accepts, causing thickening of the rejects, and rejecting good fibers. It is believed that with the construction according to the invention it is considerably easier to guide flocs toward the narrow slot openings where they gradually become compressed in the smaller slot section. The fiction force created between the compressed fiber flocs and the side walls inside the slots can now be overcome, as the slot entrance remains "open" instead of being plugged with flocs of fibers. With an unplugged or "open" slot entrance it is then possible for the pressure drop over the screen cylinder, combined with small positive pulses from the rotation of the rotor foil or protrusion leading edges, to effectively push the compressed flocs out from the narrow slots into the relief grooves on the accepts side.

Another potential advantage of the construction according to the invention is the enhanced debris removal efficiency. With small slots and long fibers, conventional modern screening operations using, for example, OCC secondary fibers have to compromise between efficiency and fractionation (rejecting) the valuable long fibers. In order not to fractionate out the valuable long fibers it is necessary to operate the screens with fairly high passing velocities in the slots, which creates a high push/pull type force on the fibers (or flocs) in the slots, keeping them from moving into the accepts. However in order to have good efficiency and debris removal it is generally accepted that the passing velocity in the slots has to be fairly low as higher passing velocities have a detrimental affect on efficiencies. However the constructions according to the invention allow the screen cylinders to be operated with lower passing velocities in the slots, without increased fractionation of long fibers.

In an exemplary embodiment of the invention, a screen cylinder having a screening surface and an accepts surface on opposite faces thereof is provided for screening pulp flowing in a flow direction to separate accepts from rejects. The screen cylinder includes a plurality of grooves defined in the screening surface generally transverse to the flow direction; a slot defined in each of at least a plurality of the grooves; and each of the grooves having an upstream curved or substantially planar surface, and a curved or substantially planar downstream surface having a first portion thereof remote from the slot defining an angle that is about 5–40 degrees, preferably 10–30 degrees, with respect to the flow direction, and a second portion thereof adjacent the slot defining an angle that is about 45–80 degrees with respect to the flow direction. The cylinder may be made from a plate with the grooves milled and the slots cut therein, or alternatively, may be made from a plurality of bars or wires mounted so that they are substantially parallel to each other, defining the grooves and slots therebetween.

In the bars or wires context, substantially each of the bars or wires preferably includes a transition between the upstream and downstream surface thereof, wherein the transition includes a portion substantially parallel to the flow direction and a substantially sharp edge between the upstream surface and the transition. Moreover, substantially each bar or wire preferably includes a transition between the upstream and downstream surface thereof contoured so that turbulence is formed at the slot and so as to substantially avoid the Coanda effect at the slot.

The downstream surface is preferably substantially convex. Also, there may be a clearly defined break in the downstream surface between the first and second portions thereof, and the slots preferably have a substantially uniform width of between about 0.05 mm–0.5 mm.

In another exemplary embodiment of the invention, a screen cylinder having a screening surface and an accepts surface on opposite faces thereof is provided for screening pulp flowing in a flow direction to separate accepts from rejects. The screen cylinder includes a plurality of grooves defined in the screening surface generally transverse to the flow direction; a slot defined in each of at least a plurality of the grooves; and the screen cylinder grooves and slots being contoured so that the slots have a nozzle or discharge coefficient C at least 10% greater at substantially the same debris removal efficiency compared to a wedge wire screen cylinder having the same slot width, for the same pulp furnish, wherein grooves of the wedge wire screen cylinder have a sloped downstream surface, an upstream surface making an angle of about 70–110 degrees with respect to the flow direction, and a rounded transition between the upstream and downstream surfaces. The screen cylinder may have a coefficient C that is about 20–50% greater compared to the wedge wire screen cylinder. In addition, the screen cylinder preferably has a coefficient C equal or proportional to greater than about 0.5 when the velocity of the flow of pulp through the slots is between about 1.5–5.0 m/s, and the pulp has a consistency between about 0.8–5%. The screen cylinder may have slots about 0.17 mm wide, or an equivalent, when screening TMP has greater capacity and at least about 30% less shives in the accepts compared to the wedge wire screen cylinder which has 0.15 mm slots, or an equivalent. In another arrangement, the screen cylinder may have slots about 0.15 mm wide, or an equivalent, has substantially the same operating characteristics at typical average passing velocities of 1.5–2 m/s in the slots as the wedge wire screen cylinder which has 0.2 mm slots, or an equivalent, when screening CTMP at a consistency of about 1.5%, or the equivalent.

In yet another exemplary embodiment of the invention, a screen cylinder having a screening surface and an accepts surface on opposite faces thereof is provided for screening pulp flowing in a flow direction to separate accepts from rejects. The screen cylinder includes a plurality of grooves defined in the screening surface generally transverse to the flow direction and each including an upstream surface and a downstream surface: a slot defined in each of at least a plurality of the grooves; and the screen cylinder grooves and slots being contoured so that the cylinder includes a transition between the upstream and downstream surfaces thereof contoured so that turbulence is formed at the slot and so as to substantially avoid the Coanda effect at the downstream/upstream transition area, and define a funnel at the slot improving at least one of capacity or debris removal efficiency while not adversely affecting the other of capacity or debris removal efficiency, and substantially de-flocculating the pulp.

BRIEF DESCRIPTION OF THE DRAWINGS

These and other aspects and advantages of the invention will be described in detail with reference to the accompanying drawings, in which.

DETAILED DESCRIPTION OF PREFERRED EMBODIMENTS

Figure 1:
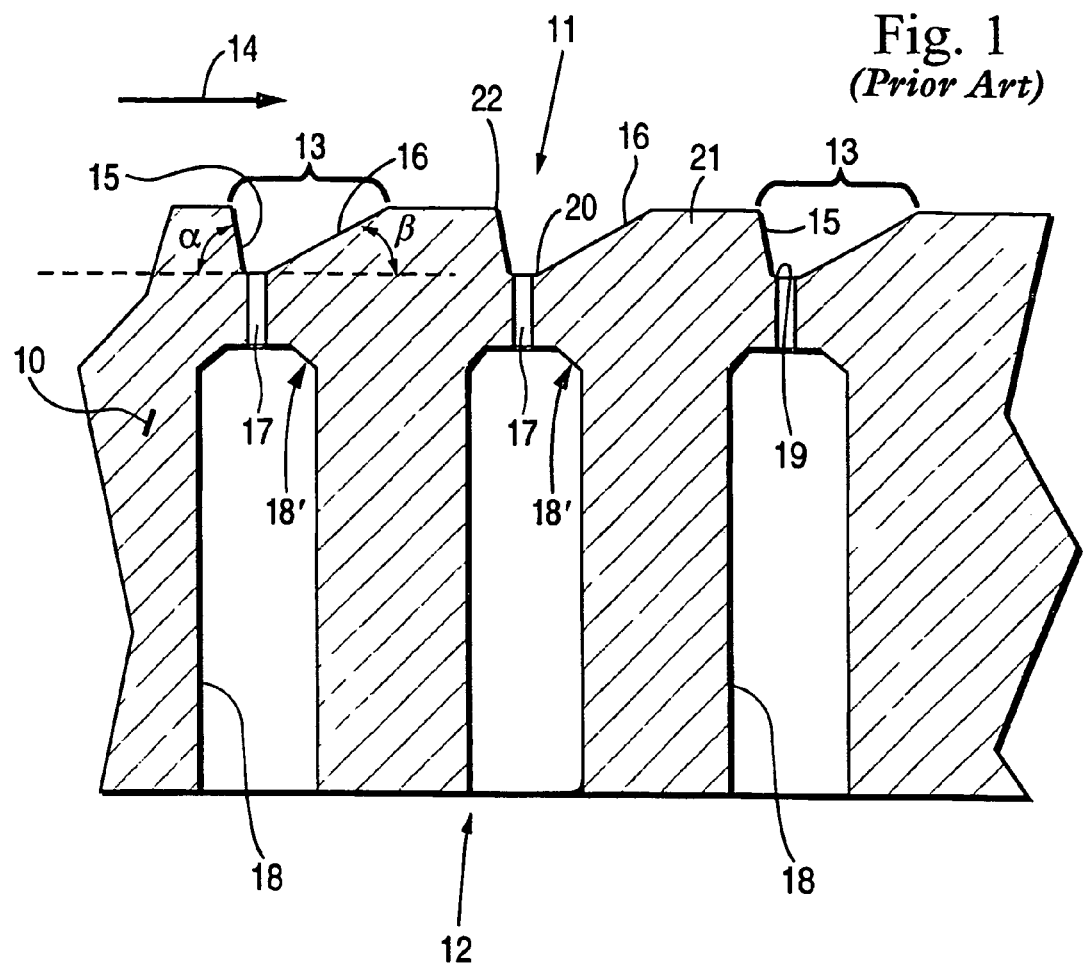
FIGS. 1 and 2 are greatly enlarged schematic cross-sectional views of an exemplary milled cylinder contour, and wedge wire cylinder contour, respectively, according to the prior art.

FIG. 1 schematically illustrates a cross sectional configuration (greatly enlarged for clarity of illustration) of an exemplary high debris efficiency removal screen cylinder contour, such as shown in U.S. Pat. Nos. 4,529,520, 5,524, 770, and 5,607,589, the disclosures of which are incorporated by reference herein. Commercial versions of this screen cylinder are sold by CAE ScreenPlates Inc. of Glens Falls, N.Y. under the trademark "PROFILE®". The screen cylinder contour illustrated in FIG. 1 is milled into a piece of metal, and comprises a cylinder body 10 having a screening surface 11 and an accepts surface 12. Normally, the surface 11 is on the interior of the cylinder 10, but may be on the exterior.

The screening surface 11 comprises a plurality of grooves 13 provided in repeating patterns along the surface 11 and preferably substantially completely covering the screening surface 11. The grooves 13 are substantially transverse to the general tangential flow direction 14 of cellulose pulp being screened. The grooves 13 may extend substantially the entire length (height) of the cylinder 10, or more typically are interrupted at various points along the cylinder 10 by load bearing bands.

Each of the grooves 13 is formed by an upstream (with respect to the tangential direction of pulp flow 14) surface 15, and a downstream surface 16. The surface 15 is substantially perpendicular to the flow direction 14 (e.g. preferably has an angle $\alpha$ of between about 70–110°, e.g. about 85°), and the downstream surface 16 is sloped over at least a majority of the extent thereof, preferably having an angle $\beta$ of between about 5–60° (e.g. about 15°–30°, most preferably about 15–25°). A screening slot 17 is defined between the surfaces 15, 16, opening up into an enlarged opening (relief slot, groove, or opening) 18 providing communication between the surfaces 11, 12. The screening slots 17 have the width thereof as the critical dimension, that is a dimension parallel to the general flow path 14: typical widths for the slots 17 are 0.002–0.024 inches, e.g. between about 0.05–0.5 mm. A slot 17 may take up the entire transition of the surfaces 15, 16 to each other at the bottom of the groove 13, or a substantially flat (not sloped) continuation of the downstream surface 16 may be provided in which the groove 17 is formed. In any event, each of the grooves 13 often has a substantially sharp edge portion 19 at the upstream edge of the screening slot 17, and another substantially sharp edge portion 20 at the downstream edge of the screening slot 17. If not substantially perpendicular to the envelope surface, the portion 19, or a transition surface between elements 15 and 17, may be formed by an approximately 45° chamfered or curved-surface milling tool.

Further, the surface 11 typically is also defined by an upper transition 21 between adjacent surfaces 15, 16. The transition 21 preferably includes a portion substantially parallel to the tangential flow direction 14 of the pulp, and also includes a substantially sharp edge 22. By "substantially sharp edge" is meant an edge having no radius of curvature, or a radius of curvature of less than about 0.3 mm, and one which avoids the Coanda effect. The configuration of the relief opening 18 (particularly at the portion 18' thereof) provides a plug phenomena, preventing excess reverse flow of fibers during negative pulsing.

In the operation of the screen cylinder 10, either the screen cylinder is rotated so that it moves in the tangential direction 14, or the screen cylinder 10 remains fixed while the pulp is moved in the tangential direction 14 (e.g. with a conventional rotor). In the case of a rotating cylinder the arrow 14 would be indicating the relative speed of the suspension. The typical desired velocity of the pulp as it passes through the slots 17 is about 1.5–2.0 m/sec. but may be between 0.7–4.0 m/sec. In any event, pulp enters each of the grooves 13 and because of the contour thereof, the pulp is subjected to micro turbulence, so that a very high percentage of the debris in the pulp flowing in direction 14 is removed, that is precluded from passing through the slot 17, while the desired pulp fibers do pass through the slot 17. Utilizing the slotted screen cylinder 10 as illustrated in FIG. 1, it is not unusual to get debris removal efficiencies of 75% or greater.

Figure 2:
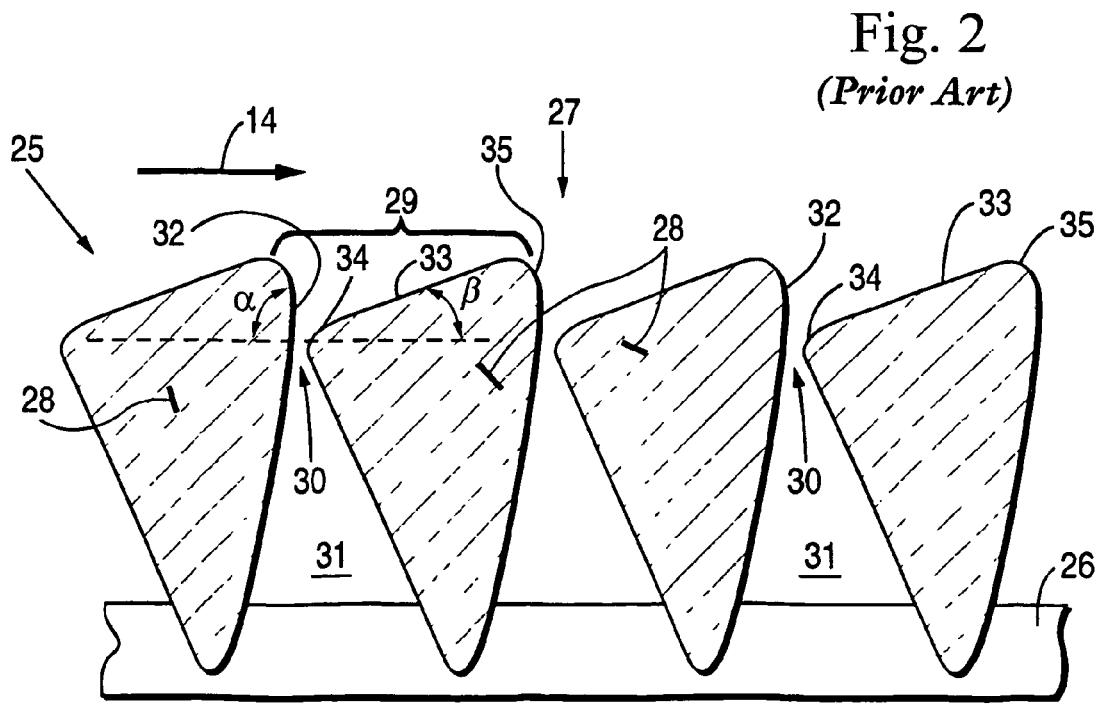

FIG. 2 is a view like that of FIG. 1 only showing a conventional wedge wire screen cylinder, shown generally by reference numeral 25, and including a screen cylinder frame 26 and having a screen surface shown generally by reference numeral 27. The wedge wire screen cylinder 25 is formed of a plurality of discrete elements, as opposed to the milled configuration for the screen 10. That is, the screen surface 27 is defined by a plurality of metal bars or wires 28, which are adhesively, by mechanical locking, by welding, or a combination thereof, attached to the frame 26. The frame 26 comprises a plurality of widely spaced rings. The bars or wires are cut to axial cylinder lengths in mechanical locking or welded designs and when of resistance welded wedge wire style, the wires are continuous and wrapped around supports 26. Both of these techniques are conventional.

Like the milled screen cylinder 10 the general contour of the bars or wires 28 simulates a plurality of grooves 29, slots 30 opening up into a wide volume 31, with the slots 30 defined between substantially perpendicular (i.e. angle a about 70–110°) upstream surface 32, and a downstream surface 33 having an angle $\beta$ of about 5–60° (e.g. 5–40° or 10–30°), in both cases the angles $\alpha$, $\beta$ being measured with respect to the tangential pulp flow direction 14.

While the wedge wire screen cylinder 25 attempts to generally simulate the milled contour of screen cylinder 10, because of the configuration of the bars or wires 28 typically used, and their mounting in the rings 26, there are no substantially sharp edges, such as provided at 19, 20, and 22 in the milled screen 10 of FIG. 1. Rather, the upstream surface 32 is substantially continuously and slightly curved or flat, extending from the groove simulation 29 into the open area 31, while the edges 34, 35 at the transitions between adjacent surfaces 32, 33 at both the closest point to the slot 30 and the furthest point from the slot 30 are typically rounded (having a radius of more than 0.3 mm for the edge 34), e.g. not substantially sharp edges. Because of this configuration the screen cylinder 25 suffers from the Coanda effect, allowing a greater amount of debris than desired to enter slots 30. Even if a substantially sharp edge is provided, however, such as schematically illustrated in U.S. Pat. No. 5,255,790, no substantially flat surface (compared to the tangential movement of the pulp 14) is provided at the transition 35.

Despite the fact that the conventional wedge wire cylinders 25 have a similar contour to the milled screen cylinders 10, and often have a greater capacity, the debris removal efficiency of the wedge wire cylinders 25 (at comparable operating conditions) is much lower than for the milled cylinders 10. For example, in one test in which a milled cylinder 10 and a wedge wire cylinder 25 made by the same company and having similar contours (such as schematically illustrated in FIGS. 1 and 2) were tested using substantially the same furnish and other relevant conditions, the milled cylinder 10 had a debris removal efficiency of over 77%, while the wedge wire screen cylinder 25 had a debris removal efficiency of about 40%.

Figure 3:
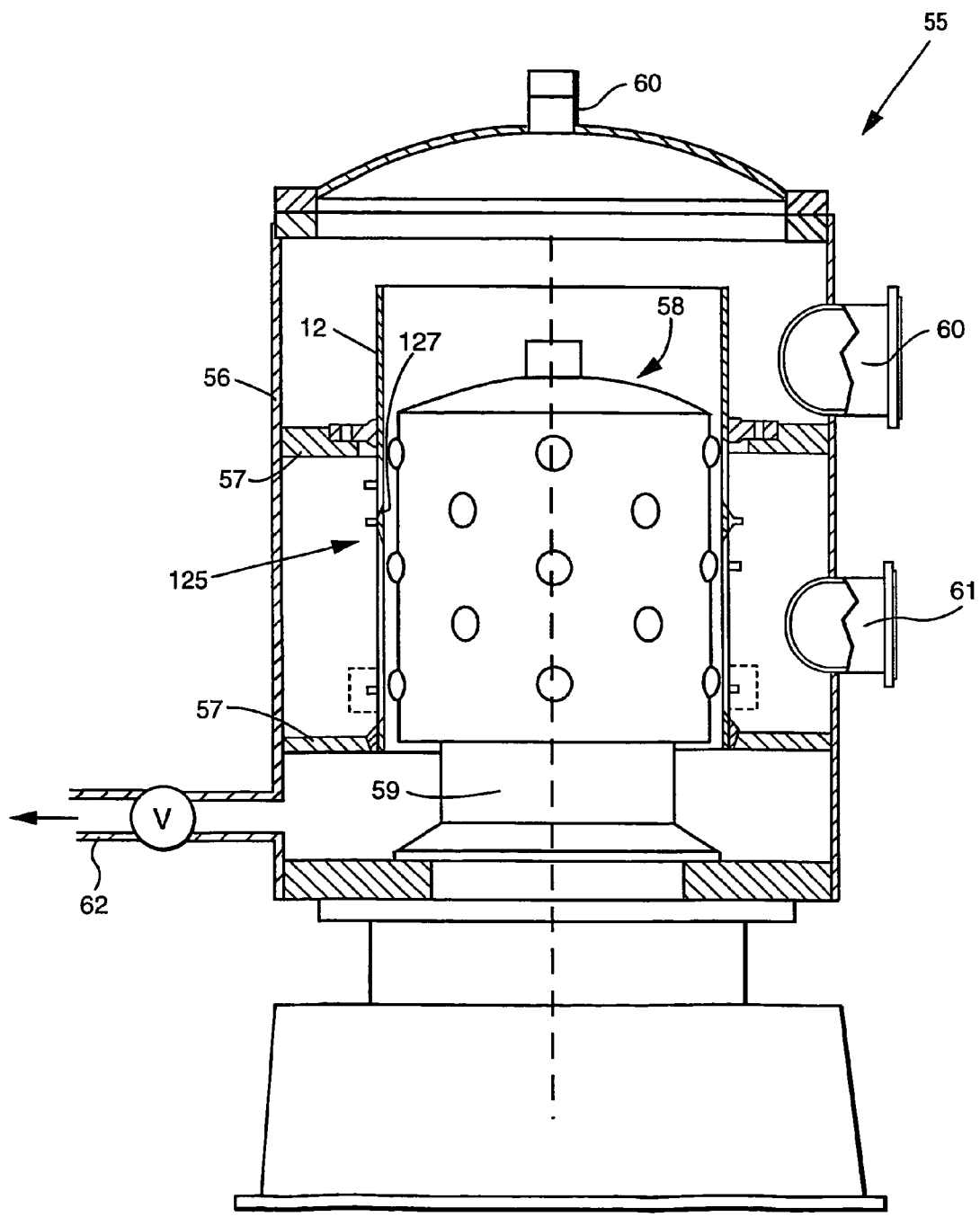
FIG. 3 is a longitudinal cross-sectional view showing the screen cylinder of the invention in a pressure screen for normal operation.

A screen cylinder according to the present invention is shown schematically at 125 in FIG. 3, having a screening surface 127, and schematically illustrates the screen cylinder 125 in association with a pressure screen 55 of conventional design, including a housing 56 in which the screen cylinder 125 is mounted. In this embodiment the cylinder 125 is essentially stationary, and is mounted on the stationary mounting element 57 within the housing 56. Mounted within the screen cylinder 125 is a foil or rotor 58 which is rotated about a substantially vertical axis defined by the shaft 59 so that there is relative movement between the screening surface 127 and the foil or rotor 58 causing the pulp to flow (in direction 14) past the screen surface 127 to separate accepts from rejects, e.g. at a passing velocity of between about 0.7–4.0 m/sec., preferably between about 1.5–2.0 m/sec. Alternatively or in addition, the cylinder 125 can be rotated about the axis of a shaft.

The housing 56 includes an inlet 60 for the pulp, an accepts outlet 61, for pulp that has passed through the screen slots, and a rejects outlet 62 for reject material does not pass through the screen 125.

Figure 4:
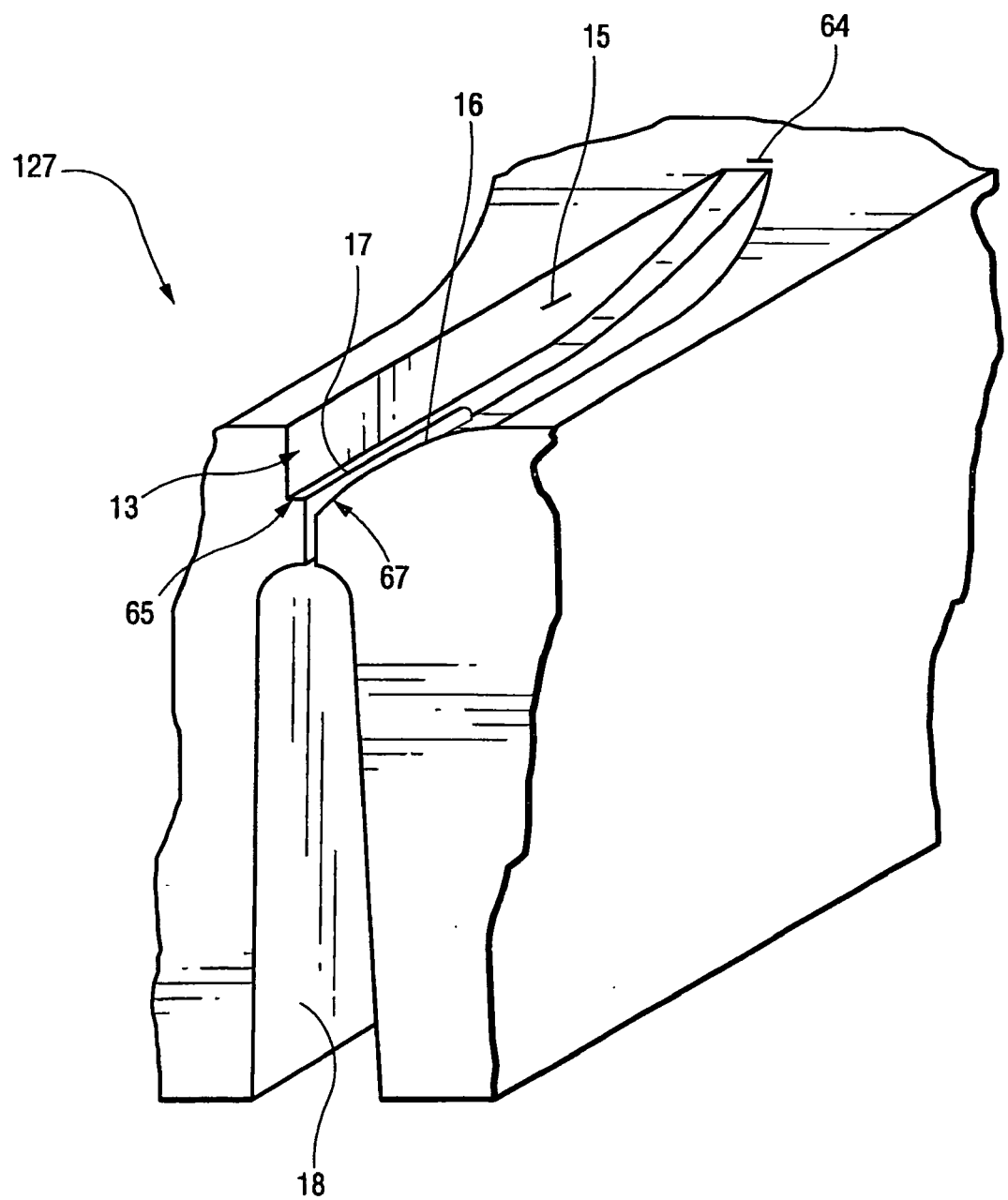
FIG. 4 is a detailed schematic perspective view showing the configuration of the screen surface of a cylinder according to the invention, and particularly one groove and slot therein.
Figure 5:
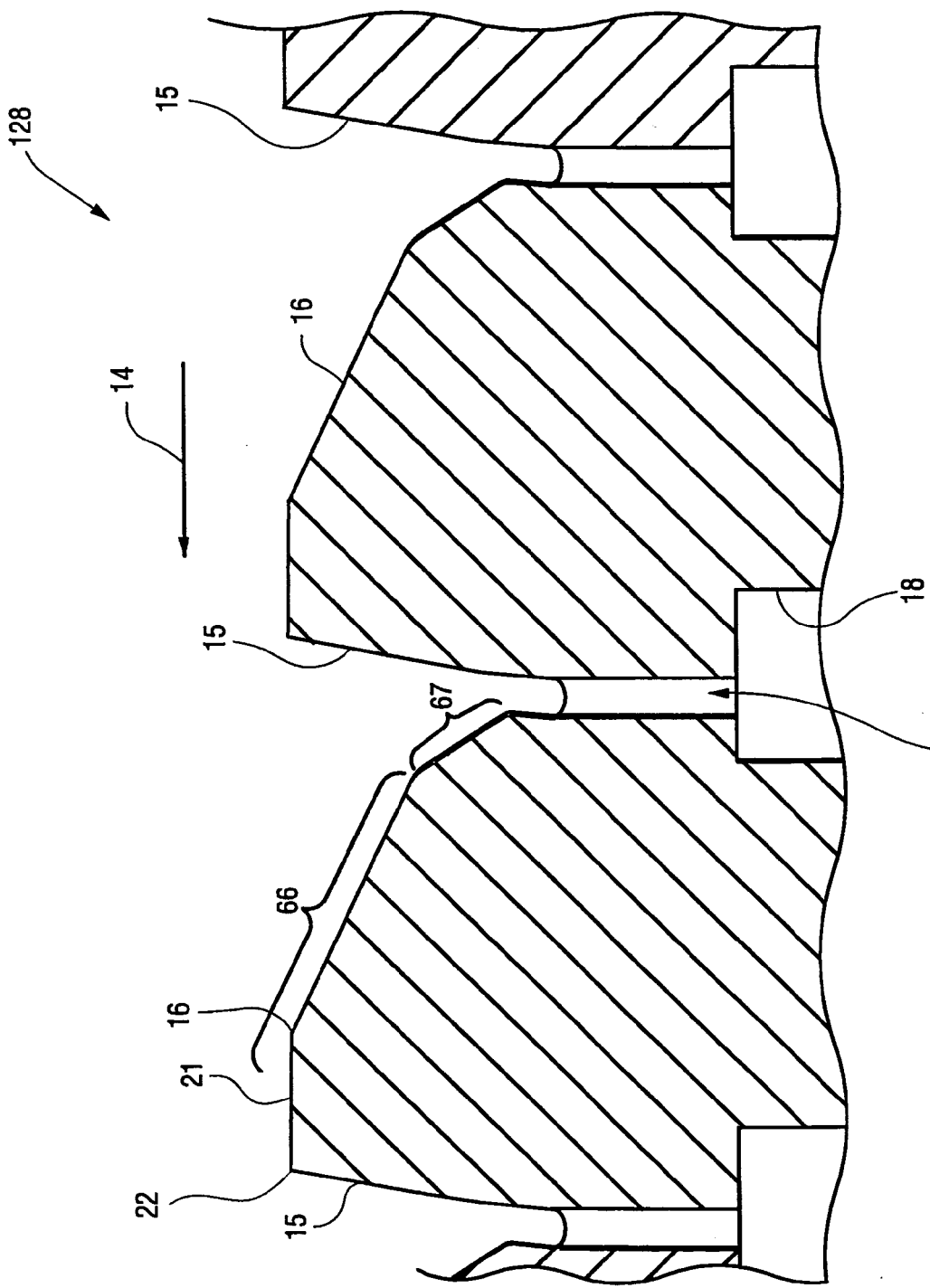
FIG. 5 is a drawing based on an impression of an actual screen cylinder according to the present invention.

FIG. 4 schematically illustrates a portion of the screening surface 127, of a screen cylinder 125 according to the invention, that has a milled configuration where a groove 13 terminates, as illustrated at 64. Even with the enlargement provided in the schematic representation of FIG. 4, however, it is difficult to see the seemingly minor, but extraordinarily effective and important, modification of a contour of the groove 13 adjacent the slot 17 that achieves the desired results according to the present invention, such as the surface 67 from FIG. 5. In the FIG. 4 embodiment a small surface 65 is provided adjacent the upstream surface 15; the surface 65 may or may not be provided. The typically 0.1–0.5 mm side surface 65 is not necessarily desirable but may occur when machining slots out of plates and having difficulties with indexing the tools. The slots 13 with surface 65 can be produced by milling, water-jet cutting, laser cutting. etc. In FIG. 5 the magnification is great enough to more clearly illustrate the change in contour according to the invention.

According to the invention, as illustrated in FIG. 5, the downstream surface 16 (which may be curved or substantially planar—the substantially planar version illustrated in FIG. 5) has a first portion 66 most remote from the slot 17, and a second portion 67 adjacent the slot 17. The portion 67 has a much greater angle with respect to the tangential flow direction 14 than does the portion 66. For example in the preferred embodiment the portion 66 has an angle that is roughly about 5–40°, preferably about 10–30°, most preferably about 15–25° with respect to the tangential flow direction 14, while the second portion 67 (which may be substantially flat, or curved to a predetermined radius greater than 0.3 mm) has an angle to the tangential flow direction 14 that is at least 100 greater than the angle of the portion 66, and typically is about 45–80° (e.g. about 2–5 times as great as the angle of the portion 66). The second portion 67 thus provides essentially a "funneling" action adjacent the slot 17 which apparently increases the capacity of the screen cylinder 125 according to the invention without adversely affecting the debris removal efficiency. In FIG. 5 a flat surface 21 is shown, but is not essential, and becomes less essential as angle β in FIGS. 1 and 2 is below 15°.

To demonstrate the highly advantageous results according to the invention, the screen cylinder 125 of FIG. 5, which is a modified form of a conventionally milled cylinder in accordance with the teaching for slotted cylinders in the U.S. '520 Profile ® patent and manufactured by CAE Screen-Plates Inc. of Lennoxville, Quebec, Canada, was tested in comparison to an unmodified conventional milled Profile® cylinder, except for surface 67, as illustrated in FIG. 4. This evaluation was done in a pressurized small laboratory screen called a CSS-screen. This laboratory screen uses 50 mm wide coupons with ten slots in each coupon, which are curved in order to operate with a foil rotor in a 286 mm diameter chamber. The lab screen is highly useful in making relative comparisons, but the results cannot be scaled up to commercial size screens. The results of this testing are set forth in Table I below.

TABLE I

| | | Slot Velocity (m/s) | Pressure Drop | Accept Pressure | Accept Consistency | Measured Capacity |
|---|---|---|---|---|---|---|
| I | 1000 rpm | 0.57 | 0.52 | 6.73 | 0.53 | 15.0 |
| | Back Pressure (BP) | 0.53 | 0.37 | 11.71 | 0.57 | 15.2 |
| | 1500 rpm | 0.70 | 0.87 | 11.68 | 0.51 | 17.9 |
| | BP | 0.59 | 1.00 | 16.93 | 0.57 | 17.1 |
| II | 1000 rpm | 0.47 | 0.46 | 6.96 | 0.48 | 11.1 |
| | BP | 0.43 | 0.52 | 10.83 | 0.53 | 11.4 |
| | 1500 rpm | 0.66 | 1.36 | 11.98 | 0.49 | 16.0 |
| | BP | 0.68 | 1.14 | 13.65 | 0.47 | 15.8 |
| III | 1000 rpm | 1.06 | 0.32 | 7.58 | 0.66 | 30.3 |
| | BP | 1.00 | 0.46 | 11.10 | 0.66 | 28.6 |
| | 1500 rpm | 1.61 | 0.61 | 13.58 | 0.71 | 49.8 |
| | BP | 1.58 | 0.84 | 16.30 | 0.74 | 50.7 |

In Table I, test batteries I and II are with the same coupon of the conventional Profile® style similar to that illustrated in FIG. 4, whereas the coupon in test battery III has the configuration of FIG. 5, according to the invention. The fundamental difference between these two coupons is the provision of the second portion 67 as illustrated in FIG. 5 of the drawings. What these results show is that by providing the funneling portion 67 according to the present invention the measured capacity is approximately doubled, yet there is no significant adverse affect on debris removal efficiency.

Figure 6:
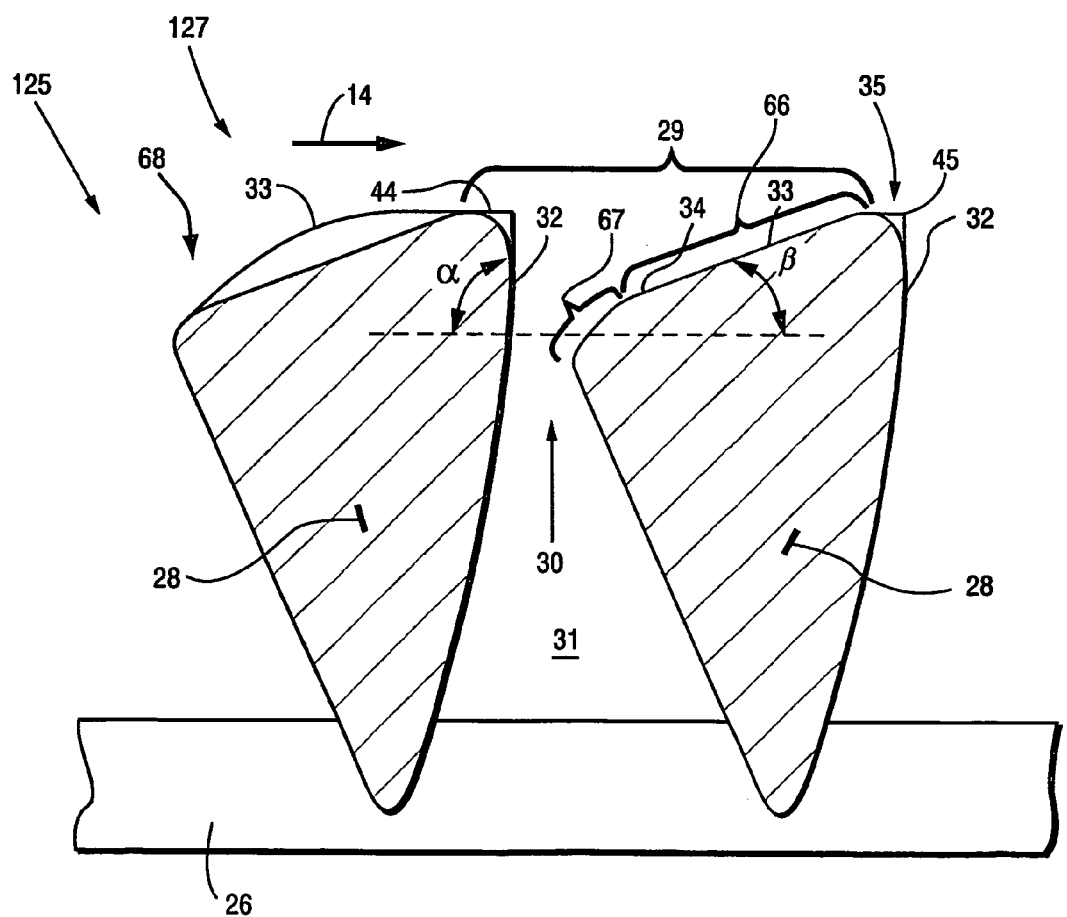
FIG. 6 is a view like that of FIG. 2 only showing the wires or bars making up the screen cylinder contoured so as to obtain the advantageous results according to the claimed invention.

The invention does not achieve its desired results solely in milled cylinders, but also in wedge wire or other discrete element cylinders. One such cylinder is schematically illustrated in FIG. 6. The bars or wires 28 of the screen cylinder 125 seen in FIG. 6 have the same configuration as that of FIG. 2 except the transition 35 between the surfaces 32, 33 (that is the furthest point from the slot 30 in a direction perpendicular to the tangential flow direction 14) has a short substantially planar surface 44 substantially parallel to the flow direction 14, and with a substantially sharp edge 45. This substantially avoids the Coanda effect at the slot 30. While in FIG. 6 for clarity of illustration the surface 44 is shown as flat and the edge 45 is completely sharp, in actuality there will be a slight rounding, but much less than in the prior art of FIG. 2, and substantially avoids the Coanda effect.

Also in FIG. 6, according to the invention, the downstream surface 33 of the "groove" 29 is configured so as to provide the following effect. For the right hand wire 28 in FIG. 6, there are two distinct portions of the surface 33, 66, 67, substantially as illustrated in FIG. 5 for the milled cylinder. However for the left hand bar 28 in FIG. 6, the surface 33 is substantially convex rather than substantially flat as illustrated for the right hand bar, but has a portion 68 there that makes an angle, or has an average tangent making an angle, that is about 45–80° to the flow direction 14, and provides a funneling effect. A worn out cylinder (or unused) contour as illustrated in FIG. 2 can be modified or rebuilt by for instance a grinding or machining processes, to the same configuration as illustrated in FIGS. 5 and 6. Pre-machining drawn wires to eliminate the undesirable, typical rounded edges, prior to cylinder assembly, can also accomplish the configuration in FIGS. 5 and 6.

For both the embodiments of FIGS. 5 and 6, one good measure of the effectiveness of the operation of the screen cylinder 125 according to the invention is what is known as the nozzle coefficient, or sometimes known as the discharge coefficient, and is represented by the designation "C". In fluid dynamics the approximate discharge through an orifice or nozzle is determined according to the following equation which uses C:

$$Q = 19.636\, Cd_1^2 \sqrt{h} \sqrt{\frac{1}{1-\left(\frac{d_1}{d_2}\right)^4}} \quad \text{where } \frac{d_1}{d_2} \text{ is greater than 0.3}$$

$$Q = 19.636\, Cd_1^2 \sqrt{h} \quad \text{where } \frac{d_1}{d_2} \text{ is less than 0.3}$$

Q=flow, in gpm
$d_1$=dia of orifice or nozzle opening, inches
h=differential head at orifice, in feet of liquid
$d_2$=dia of pipe in which orifice is placed, inches
C=discharge coefficient The nozzle or discharge coefficient C varies depending upon the fluid (water, or pulp with a certain level of solids consistency) and the particular configuration of the nozzle or orifice. For example using water as the fluid, the following coefficients C are provided for the conventional structures: short re-entrant tube, 0.52, sharp-edged orifice 0.61; square edged tubular area, 0.61; long re-entrant tube, 0.73; square edged long re-entrant tube, 0.82; well rounded orifice, 0.98.

Having the coefficient C in mind, tests were performed to evaluate the invention, as illustrated in FIG. 5, compared to a conventional wedge wire screen cylinder which has a sloped downstream surface, an upstream surface making an angle of about 70–110°, e.g. about 70–90°, with respect to the flow direction 14, and a rounded transition between the upstream and downstream surfaces. The following are conditions and results of that test:

| | |
|---|---|
| Pressure Screen: | Bird M-200 |
| Screen Cylinders: | 0.15 mm Milled Screen Cylinder per invention |
| | 0.20 mm conventional wedge wire |
| Flow Conditions: | Accept Flow = 2500 lpm, Reject Rate = 10% |
| Feed Pulp: | Spruce-Pine-Fir CTMP, CSF = 170, |
| | Consistency = 1.5% |
| | Fibre Length = 1.75 mm |

TABLE II

| | Invention | Wedge Wire |
|---|---|---|
| Open Area (dm²) | 1.43 | 2.41 |
| Slot (Passing) Velocity (m/s) | 2.91 | 1.73 |
| Accept Consistency | 1.13 | 1.11 |
| Accept Average Fibre Length | 1.63 | 1.66 |
| Capacity (OD tons/day) | 40.7 | 40.0 |
| Pressure Drop (kPa/PSI) | 13.5/2.0 | 9.0/1.3 |
| Motor Load (kW) | 40.9 | 43.1 |
| Maximum Accept Flow (lpm) | ~4000 | ~6000 |
| Motor Load @ Max Flow | 44.9 | 51.8 |

Unfortunately the CTMP pulp used for the tests in Table II is well screened and contains very few shives, therefore it was not worthwhile to try and evaluate shive removal efficiencies between the two different screen cylinders, but it is known that the screening efficiency of the cylinder according to the invention would have been much greater. What the test did clearly, and very surprisingly, show is that a milled cylinder with 0.15 mm slots could operate at the normal commercial production rate of this screen of about 40 ADMT/D. This rate was substantially the same as (and in fact even slightly greater than) a wedge wire cylinder with 0.2 mm slots, despite the fact that normally the larger the slots the greater the capacity, and the wedge wire configuration typically has greater capacity than a milled cylinder configuration. That is, the milled cylinder according to the invention, as illustrated in FIG. 5, despite the fact that it had 25% smaller slots and 40% less open area still had substantially the same (even slightly greater) capacity than the conventional wedge wire screen. During the testing pulp was sampled at 2500 liters per minute accept flow rate. After sampling the flow rate was pushed to its maximum value at a volumetric reject rate of 10%. The wedg,e wire screen cylinder had approximately 50% more maximum volumetric capacity than the milled screen cylinder according to the invention.

Figure 7:
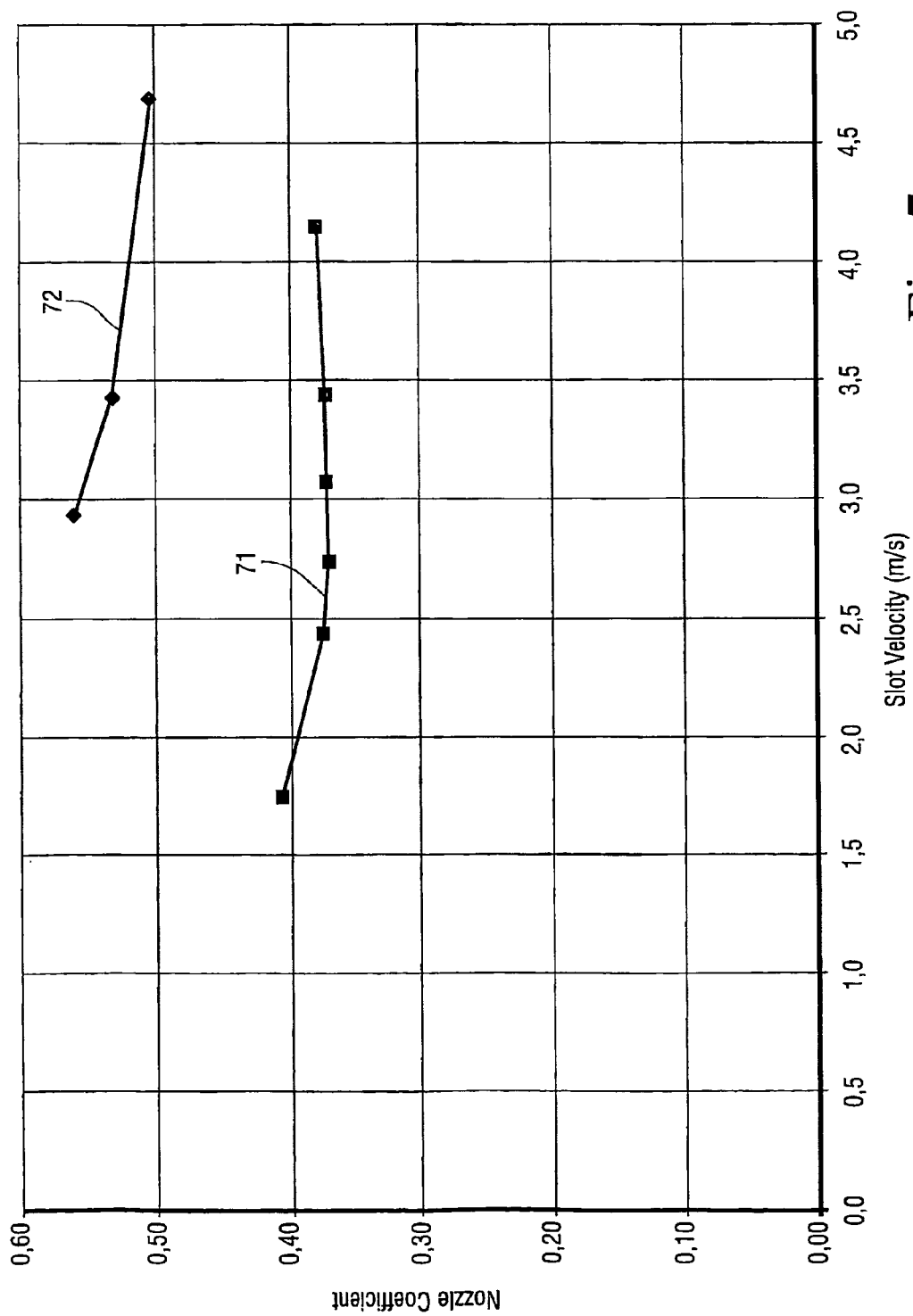
FIG. 7 is a plot of nozzle coefficient versus slot velocity showing a much higher nozzle coefficient that is obtained according to the present invention compared to conventional wedge wire screen cylinders.
Figure 8:
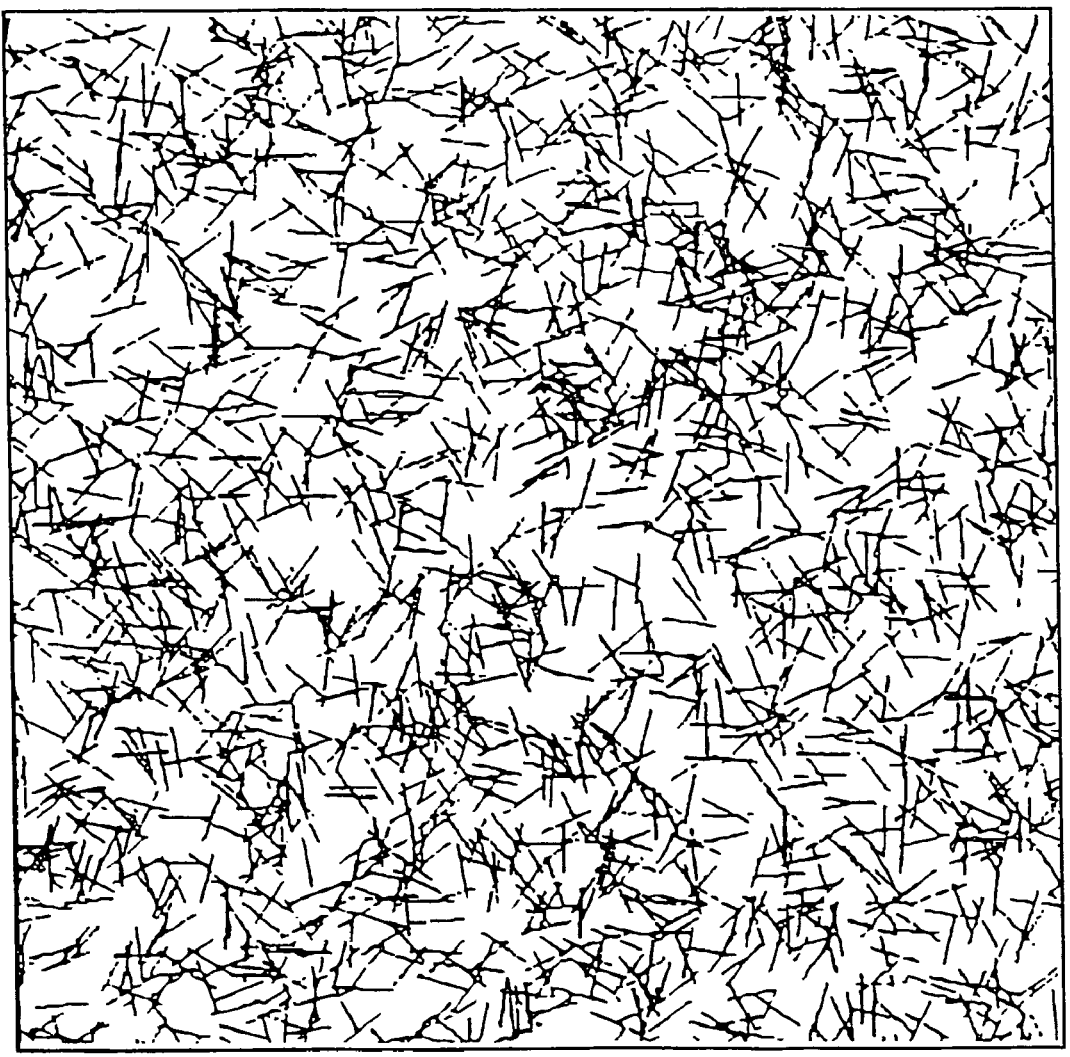
FIG. 8 is a schematic two-dimensional representation of substantially uniformly distributed fibers in a pulp suspension.
Figure 9:
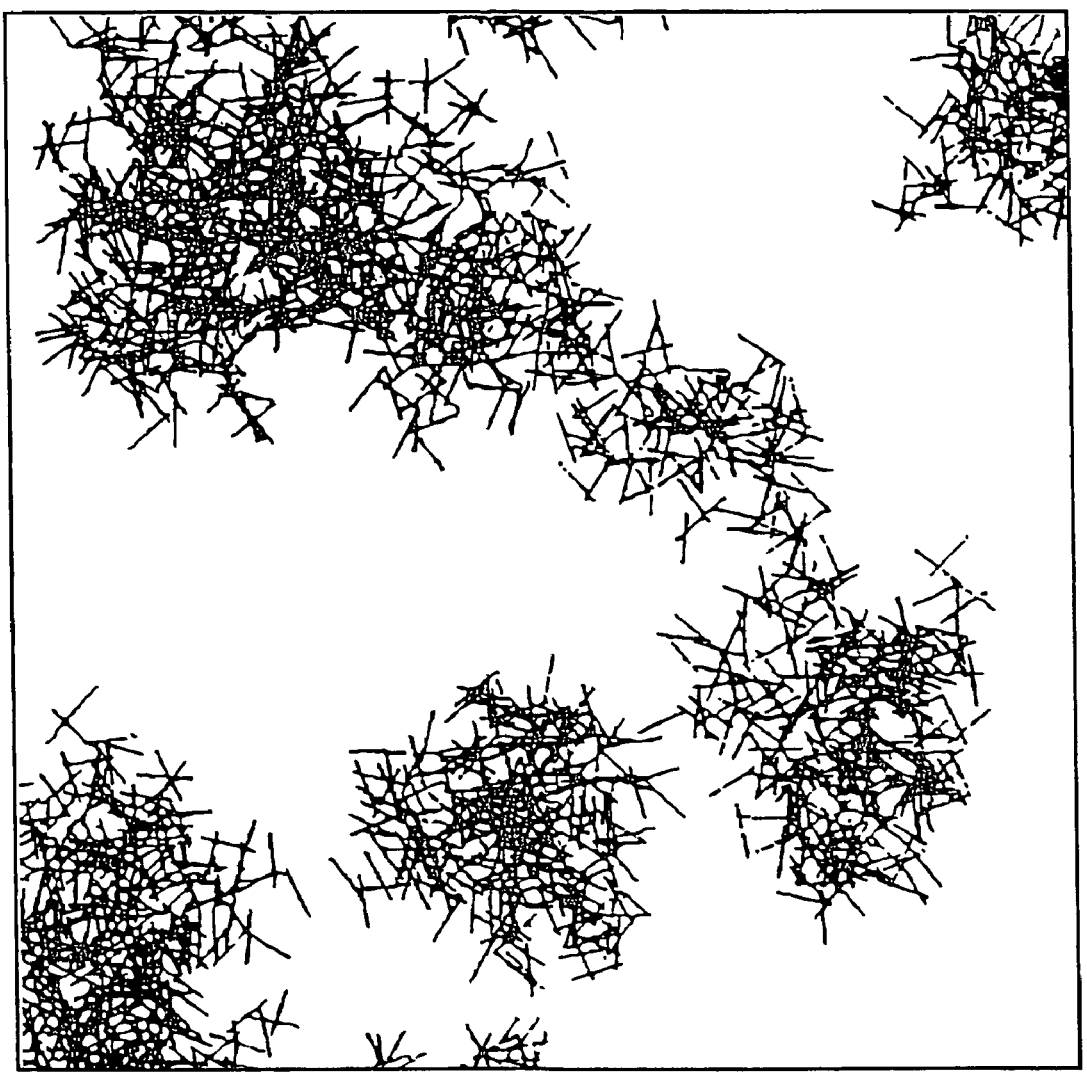
FIG. 9 is a two-dimensional representation of a more realistic fiber suspension than in FIG. 8 showing fibers formed into flocs.

In the testing represented in Table II, the wedge wire screen with 0.20 mm slots was operated at a normal commercial production rate of about 40 ADMT/D: this rate corresponds to an average passing velocity (see line 2 of Table II) of 1.73 m/s for the wedge wire cylinder (also the starting point for graph 71 in FIG. 7). The milled cylinder operated with a pressure drop that was 50% higher than for the wedge wire slot. According to fluid mechanics theory, this would cause one to expect an increase in slot velocity of about 22%. However, the observed increase in slot velocity shown in Table II was over 68%, which attests to the superior performance of the invention operating under the noted conditions.

The testing done as described above with respect to Table II can be plotted as nozzle coefficient versus slot velocity as illustrated in FIG. 7. In the plot of FIG. 7 the graphical representation 71 is for the 0.2 mm wedge wire screen cylinder, while the graphical representation 72 is for the 0.15 mm milled cylinder according to the invention. The nozzle coefficient shows the ability of each screen to transfer pressure drop into slot velocity. Slot velocity has a strong fluctuating component but is dominated by a net value through the screen cylinder. The plots in FIG. 7 indicate that the screen cylinder according to the invention is more efficient in creating passing velocity from the pressure drop.

These tests show that according to the present invention a screen cylinder (whether milled or made from discrete screen elements) has slots with a nozzle or discharge coefficient C of at least 10% greater than the conventional wedge wire screen cylinder, and typically the co-efficiency is about 25–50% greater, with substantially the same debris removal efficiency. That is the coefficient C is greater than about 0.5 when the velocity flow of pulp through the slots is between about 1.5–5.0 m/s, at least for CTMP with a consistency between 0.8–5%, particularly of about 1.5%.

Other testing was also performed to demonstrate the advantages of the invention. This testing was done using TMP (thermo-mechanical pulp) which has a very small shive (mini-shive) which is notoriously difficult to screen out. Several batteries of comparable tests were done with a conventional wedge wire screen cylinder with 0.15 mm slots and the same contour depth as a milled cylinder according to the invention as illustrated in FIG. 5, but the milled cylinder had larger slots (0.17 mm). The milled cylinder according to the invention had greater capacity and at least about 30% (typically about 30–40%) less shives (including mini-shives) in the accepts. This indicated a much greater debris removal efficiency despite the fact that the capacity was greater. This testing would have proportional results for proportional changes in the slots of the cylinders.

The screen cylinders according to the present invention are not only advantageous in the direction of accept flow, as described above, but also have important advantages during the instantaneous back-flushing negative pulse cycles. According to the invention there is a slight redirection of the negative pulse in the downstream direction, moving shives away from the vicinity of the slot 17, 30 opening. Also, when in a negative pulse cycle the configuration of the slot entrance with the funnel shape will now become the exit end for the high speed, intensive reverse flow. Due to the funnel sections favorable nozzle coefficient for the reverse flow, it will result in less resistance and higher volumetric flow and speed in the slot and at the same pulse energy, increasing the unplugging force and bringing more dilution to the screening zone.

While the invention has been described above with respect to slots, it is to be understood that the invention also has application with respect to drilled holes in screen cylinders, the holes providing apertures for screening rather than the slots. Each hole when bisected would have a configuration such as that illustrated in FIG. 5.

The invention also results in enormous advantages in the manufacture of milled screen cylinders. In the conventional manufacture of screen cylinders, the slots are cut with cutters that are so thin that they may be less than the thickness of a conventional piece of copy paper, and therefore are easy to break. In the typical manufacture of a screen cylinder such as illustrated in FIG. 1, around five or more cutters will be broken during the manufacturing process. However because of the more forgiving nature of the funneling contour of the portion 67 according to the invention, cutter breakage is much less common. As a matter of fact in the manufacture of one relatively large screen plate ultimately curved into a screen cylinder such as illustrated in FIG. 5, not one single cutter was broken, which would have been unheard of and essentially impossible when used in making a conventional construction such as illustrated in FIG. 1. The service length of the number of cuts per cutter (useful life) can be increased at least 20% (e.g. about 100%) according to the invention. and/or can improve productivity and can operate with percentage-wise higher feeds.

In the above disclosure it is to be understood that all broad ranges include all specific ranges within a broad range. For example an angle of 45–80° means 50–79°, 44.5–80.6°, 55–70°, and all other narrower ranges within the broad range. The invention is to be given a broad interpretation, limited only by the prior art.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A screen cylinder having a screening surface and an accepts surface on opposite faces thereof, for screening pulp flowing in a flow direction to separate accepts from rejects, comprising:

a plurality of grooves defined in said screening surface generally transverse to said flow direction, a slot defined in each of at least a plurality of said grooves, and each said groove having an upstream surface, and a downstream surface having a first and a second portion thereof, and a clearly defined break between said two portions, the first portion thereof remote from said slot extending generally at an angle that is about 5–40 degrees with respect to said flow direction, and a second portion having a length shorter than a length of said first portion and adjacent and terminating in said slot, said second portion extending generally at an angle that is about 45–80 degrees with respect to said flow direction.

2. The screen cylinder as recited in claim 1 wherein said cylinder comprises a cylinder made from a plate with said grooves milled and said slots cut therein.

3. The screen cylinder as recited in claim 1 wherein said cylinder comprises a cylinder made from a plurality of bars or wires mounted so that they are substantially parallel to each other, defining said grooves and slots therebetween.

4. The screen cylinder as recited in claim 3 wherein substantially each said bar or wire includes a transition between said upstream and downstream surface thereof, and wherein said transition includes a portion substantially parallel to said flow direction and a substantially sharp edge between said upstream surface and said transition.

5. The screen cylinder as recited in claim 3 wherein substantially each bar or wire includes a transition between said upstream and downstream surface thereof contoured so that turbulence is formed at said slot and so as to substantially avoid the Coanda effect at said slot.

6. The screen cylinder as recited in claim 1 wherein said slots have a substantially uniform width of between about 0.05 mm–0.5 mm.

7. The screen cylinder as recited in claim 1 wherein said first portion of said downstream surface defines an angle that is about 10–30 degrees with respect to said flow direction.

8. The screen cylinder as in claim 1 wherein a depth of each groove in said screening surface transverse to said flow direction is approximately the same.

9. A screen cylinder having a screening surface and an accepts surface on opposite faces thereof, for screening pulp flowing in a flow direction to separate accepts from rejects, comprising:

a plurality of grooves having an approximately equal depth in said screening surface generally transverse to said flow direction, a slot defined in each of at least a plurality of said grooves, and each said groove having an upstream surface, and a downstream surface having a first and a second portion thereof, wherein a length of the second portion is shorter than a length of the first portion, and a clearly defined break between said two portions, the first portion thereof remote from said slot extending generally at an angle that is about 5–40 degrees with respect to said flow direction, and a second portion thereof adjacent said slot extending generally at an angle that is about 45–80 degrees with respect to said flow direction.

10. The screen cylinder as recited in claim 9 wherein said cylinder comprises a cylinder made from a plate with said grooves milled and said slots cut therein.

11. The screen cylinder as recited in claim 9 wherein said cylinder comprises a cylinder made from a plurality of bars or wires mounted so that they are substantially parallel to each other, defining said grooves and slots therebetween.

12. The screen cylinder as recited in claim 11 wherein substantially each said bar or wire includes a transition between said upstream and downstream surface thereof, and wherein said transition includes a portion substantially parallel to said flow direction and a substantially sharp edge between said upstream surface and said transition.

13. The screen cylinder as recited in claim 11 wherein substantially each bar or wire includes a transition between said upstream and downstream surface thereof contoured so that turbulence is formed at said slot and so as to substantially avoid the Coanda effect at said slot.

14. The screen cylinder as recited in claim 9 wherein said slots have a substantially uniform width of between about .05 mm–5 mm.

15. The screen cylinder as recited in claim 9 wherein said first portion of said downstream surface defines an angle that is about 10–30 degrees with respect to said flow direction.j 16. A screen cylinder having a screening surface and an accepts surface on opposite faces thereof, for screening pulp flowing in a flow direction to separate accepts from rejects, comprising:
a plurality of grooves having an approximately equal depth in said screening surface generally transverse to said flow direction, a slot defined in each of at least a plurality of said grooves, and each said groove having an upstream surface, and a downstream surface having a first and a second portion thereof, and a clearly defined break between said two portions, the first portion thereof remote from said slot extending generally at an angle that is about 5–40 degrees with respect to said flow direction, and a second portion having a length shorter than a length of said first portion and adjacent and terminating in said slot, said second portion extending generally at an angle that is about 45–80 degrees with respect to said flow direction.

17. The screen cylinder as recited in claim 16 wherein said cylinder comprises a cylinder made from a plate with said grooves milled and said slots cut therein.

18. The screen cylinder as recited in claim 16 wherein said cylinder comprises a cylinder made from a plurality of bars or wires mounted so that they are substantially parallel to each other, defining said grooves and slots therebetween.

19. The screen cylinder as recited in claim 18 wherein substantially each said bar or wire includes a transition between said upstream and downstream surface thereof, and wherein said transition includes a portion substantially parallel to said flow direction and a substantially sharp edge between said upstream surface and said transition.

20. The screen cylinder as recited in claim 18 wherein substantially each bar or wire includes a transition between said upstream and downstream surface thereof contoured so that turbulence is formed at said slot and so as to substantially avoid the Coanda effect at said slot.

21. The screen cylinder as recited in claim 16 wherein said slots have a substantially uniform width of between about 0.05 mm–0.5 mm.

22. The screen cylinder as recited in claim 16 wherein said first portion of said downstream surface defines an angle that is about 10–30 degrees with respect to said flow direction.

* * * * *

UNITED STATES PATENT AND TRADEMARK OFFICE
CERTIFICATE OF CORRECTION

| | |
|---|---|
| PATENT NO. | : 7,168,570 B2 |
| APPLICATION NO. | : 10/399973 |
| DATED | : January 30, 2007 |
| INVENTOR(S) | : Frey Frejborg |

It is certified that error appears in the above-identified patent and that said Letters Patent is hereby corrected as shown below:

Column 13, line 3, delete ".05 mm-5mm." and insert -- .05 mm - .5mm. --

Column 13, line 6, delete "j" after the period.

Signed and Sealed this

Tenth Day of April, 2007

JON W. DUDAS
*Director of the United States Patent and Trademark Office*